United States Patent
Kim et al.

(10) Patent No.: US 7,519,276 B2
(45) Date of Patent: Apr. 14, 2009

(54) METHOD FOR DUBBING AUDIO ON REWRITABLE MEDIUM

(75) Inventors: Mi Hyun Kim, Seoul (KR); Sung Ryun Cho, Seoul (KR); Byung Jin Kim, Sungnami (KR); Kang Soo Seo, Anyang (KR); Sung Wan Park, Suwon-si (KR)

(73) Assignee: LG Electronics Inc., Seoul (KR)

( * ) Notice: Subject to any disclaimer, the term of this patent is extended or adjusted under 35 U.S.C. 154(b) by 859 days.

(21) Appl. No.: 10/443,987

(22) Filed: May 23, 2003

(65) Prior Publication Data

US 2003/0219224 A1 Nov. 27, 2003

(30) Foreign Application Priority Data

May 23, 2002 (KR) .................... 10-2002-0028779

(51) Int. Cl.
*H04N 5/91* (2006.01)
(52) U.S. Cl. .................... 386/96; 386/104; 386/52; 386/55; 386/13
(58) Field of Classification Search ............ 386/52, 386/55, 13, 104, 96
See application file for complete search history.

(56) References Cited

U.S. PATENT DOCUMENTS

| | | | | |
|---|---|---|---|---|
| 4,768,106 A | * | 8/1988 | Ito et al. ............... | 386/56 |
| 4,819,087 A | * | 4/1989 | Takeuchi et al. ........ | 386/54 |
| 5,625,570 A | * | 4/1997 | Vizireanu et al. ....... | 700/94 |
| 5,691,972 A | * | 11/1997 | Tsuga et al. .......... | 369/275.3 |
| 6,847,777 B1 | * | 1/2005 | Nakamura ............. | 386/46 |
| 7,054,790 B1 | * | 5/2006 | Rich ................... | 702/186 |
| 7,221,855 B2 | * | 5/2007 | Kim et al. ............ | 386/96 |
| 2001/0030918 A1 | * | 10/2001 | Tabuchi et al. ......... | 369/47.12 |
| 2003/0138230 A1 | * | 7/2003 | Tsurusaki et al. ....... | 385/128 |
| 2003/0142950 A1 | * | 7/2003 | Um et al. ............. | 386/40 |
| 2003/0202774 A1 | * | 10/2003 | Kim et al. ............ | 386/52 |

* cited by examiner

*Primary Examiner*—Thai Tran
*Assistant Examiner*—Helen Shibru
(74) *Attorney, Agent, or Firm*—Birch, Stewart, Kolasch & Birch, LLP

(57) ABSTRACT

A method for dubbing audio on rewritable medium such as a high-density rewritable optical disc (BD-RE) is provided, which is capable of simultaneously recording a main A/V stream and a dubbed audio stream on the recording medium, while automatically and continuously producing and recording real play lists and a virtual play list adapted to control reproduction of the main A/V stream and dubbed audio stream. The user can conveniently manage recording of a dubbed audio stream corresponding to a main A/V stream on the rewritable recording medium.

14 Claims, 4 Drawing Sheets

METHOD FOR DUBBING AUDIO ON REWRITABLE MEDIUM

BACKGROUND OF THE INVENTION

1. Field of the Invention

The present invention relates to a method for dubbing audio on rewritable medium such as a high-density rewritable optical disc which is adapted to manage recording and reproduction of a dubbed audio stream corresponding to a main A/V stream on the recording medium.

2. Description of the Related Art

Recently, standardization of new high-density rewritable optical discs has rapidly progressed, for example, BD-RE (Blu-Ray Disc REwritable), which can store a large quantity of high-quality video and audio data. As a result, products associated with such discs have also been developed. Such products are expected to be commercially available in the near future.

FIG. 1 illustrates a part of the configuration of an optical disc apparatus such as a video disc recorder (VDR) for recording or reproducing signals on a recording medium such as a BD-RE. As shown in FIG. 1, the optical disc apparatus includes an optical pickup 2 for reading out a signal recorded on a recording medium 1 such as a BD-RE or recording a data stream externally inputted thereto and subjected to a signal processing procedure, a VDR system 3 for reproducing the signal read out by the optical pickup 2 or converting a data stream externally inputted thereto into a data stream to be appropriately recordable, and signal-processing the converted data stream, and an encoder 4 for encoding an analog signal externally inputted thereto, and outputting the encoded signal to the VDR system 3.

The VDR system 3 of the optical disc apparatus having the above-mentioned configuration may record and manage, as an auxiliary audio stream, a dubbed audio stream corresponding to an A/V stream on the BD-RE 1. This will be described in detail hereinafter.

FIG. 2 illustrates a linked condition between real play lists and virtual play lists in a rewritable optical disc, for example, a BD-RE. Main A/V streams are sequentially recorded on a BD-RE, for example, the BD-RE 1 of FIG. 1, in the unit of clips, and managed for recording and reproduction thereof by real play lists recorded on the BD-RE 1 while containing play control information for reading and reproduction of the main A/V streams in the unit of clips, respectively. For example, a portion of a main A/V stream corresponding to a first clip, that is, a first clip main A/V stream (Clip 1 Main A/V Stream), is managed for its recording and reproduction by a first real play list (Real PlayList 1) containing play control information for reading and reproduction of the first clip main A/V stream, as shown in FIG. 2.

Meanwhile, a dubbed audio stream corresponding to each clip main stream is additionally recorded on the BD-RE 1 as a new clip auxiliary audio stream or dubbed audio stream. For example, a dubbed audio stream corresponding to the first clip main stream managed by the first real play list is recorded as a second clip dubbed audio stream (Clip 2 Auxiliary Audio Stream). This second clip dubbed audio stream is managed for its recording and reproduction by a second real play list (Real PlayList 2).

Also, the VDR system 3 of the above-mentioned optical disc apparatus produces and records virtual play lists in order to allow the user to optionally select, edit, and play real play lists recorded and managed in the above-mentioned procedure. As shown in FIG. 2, such a virtual play list, for example, a first virtual play list (Virtual PlayList 1), may include a play item (PlayItem) for a main path adapted to read out and reproduce the first clip main A/V stream linked to the first real play list, and a sub play item (SubPlayItem) for a sub path adapted to read out and reproduce the second clip dubbed audio stream linked to the second real play list.

Accordingly, the VDR system 3 of the optical disc apparatus can selectively reproduce the second clip dubbed audio stream managed by the second real play list at the request of the user during a reproduction operation thereof in which the first clip main A/V stream managed by the first real play list is read out and reproduced. Thus, the user can simultaneously view the video image of the first clip main A/V stream and the audio sound of the second clip dubbed audio stream.

In the above-mentioned optical disc apparatus, however, the recording of the dubbed audio stream corresponding to the main A/V stream and the second real play list (Real PlayList 2) managing the dubbed audio stream is executed in accordance with an editing operation of the user, following recording of the main A/V stream and the first real play list (Real PlayList 1). Also, the virtual play list (Virtual PlayList) linked to the first and second real play lists is subsequently produced and recorded. For this reason, there is a problem in that it is impossible to record a dubbed audio stream corresponding to a main A/V stream, simultaneously with recording of the main A/V stream.

SUMMARY OF THE INVENTION

Therefore, the present invention has been made in view of the above-mentioned problem, and an object of the invention is to provide a method for dubbing audio on rewritable medium such as a high-density rewritable optical disc (BD-RE) which is capable of simultaneously recording a main A/V stream and a dubbed audio stream on the recording medium, while automatically producing and recording real play lists and a virtual play list adapted to control reproduction of the main A/V stream and dubbed audio stream.

In accordance with the present invention, this object is accomplished by providing a method for dubbing audio on rewritable medium comprising the steps of: (A) simultaneously recording a main A/V stream and a dubbed audio stream on the rewritable recording medium; (B) producing first and second real play lists respectively adapted to control reproduction of the main A/V stream and the dubbed audio stream, and recording the first and second real play lists on the rewritable recording medium; and (C) producing a virtual play list including a play item linked to the first real play list, and a sub play item linked to the second real play list, and recording the virtual play list on the rewritable recording medium.

BRIEF DESCRIPTION OF THE DRAWINGS

The above objects, and other features and advantages of the present invention will become more apparent after a reading of the following detailed description when taken in conjunction with the drawings, in which.

DETAILED DESCRIPTION OF THE PREFFERRED EMBODIMENT

Now, preferred embodiments of a method for dubbing audio on rewritable medium in accordance with the present invention will be described in detail with reference to the annexed drawings.

Figure 1:
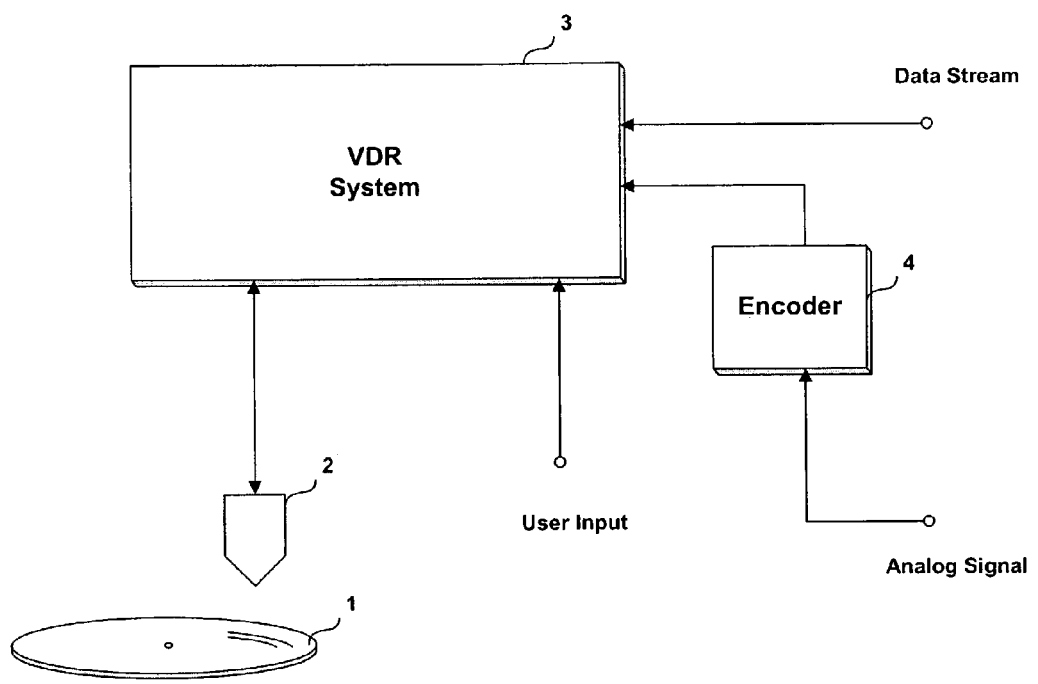
FIG. 1 is a schematic view illustrating a part of the configuration of an optical disc apparatus such as a video disc recorder (VDR)
Figure 2:
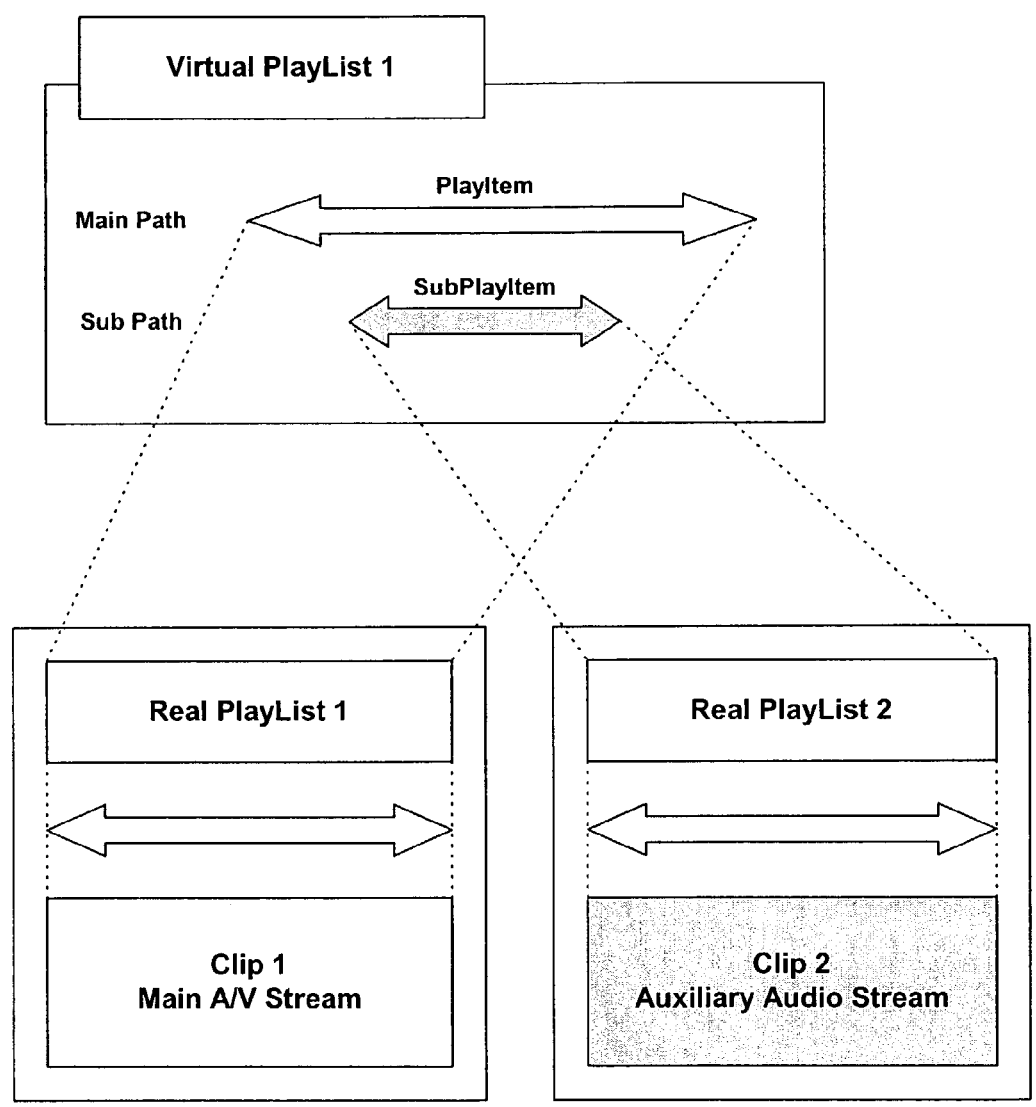
FIG. 2 is a schematic view illustrating a linked condition between real play lists and virtual play lists in a rewritable optical disc, for example, a BD-RE.

The method for dubbing audio on rewritable medium according to the present invention is applicable to the optical disc apparatus having the configuration described hereinbefore in conjunction with FIG. 1. The VDR system 3 of the optical disc apparatus can sequentially record main A/V streams in the unit of clips on a BD-RE, for example, the BD-RE 1 in FIG. 1, while simultaneously recording additionally dubbed audio streams each of which corresponds to each of the clip-unit A/V streams. The VDR system 3 can also automatically and sequentially produce real play lists (Real PlayList) and a virtual play list (Virtual PlayList) for managing recording and reproduction of each clip-unit main A/V stream and the corresponding dubbed audio stream, so that they are recorded and managed to be compatible with the file structure and format of the BD-RE 1. These operations will be described in detail hereinafter.

Figure 3:
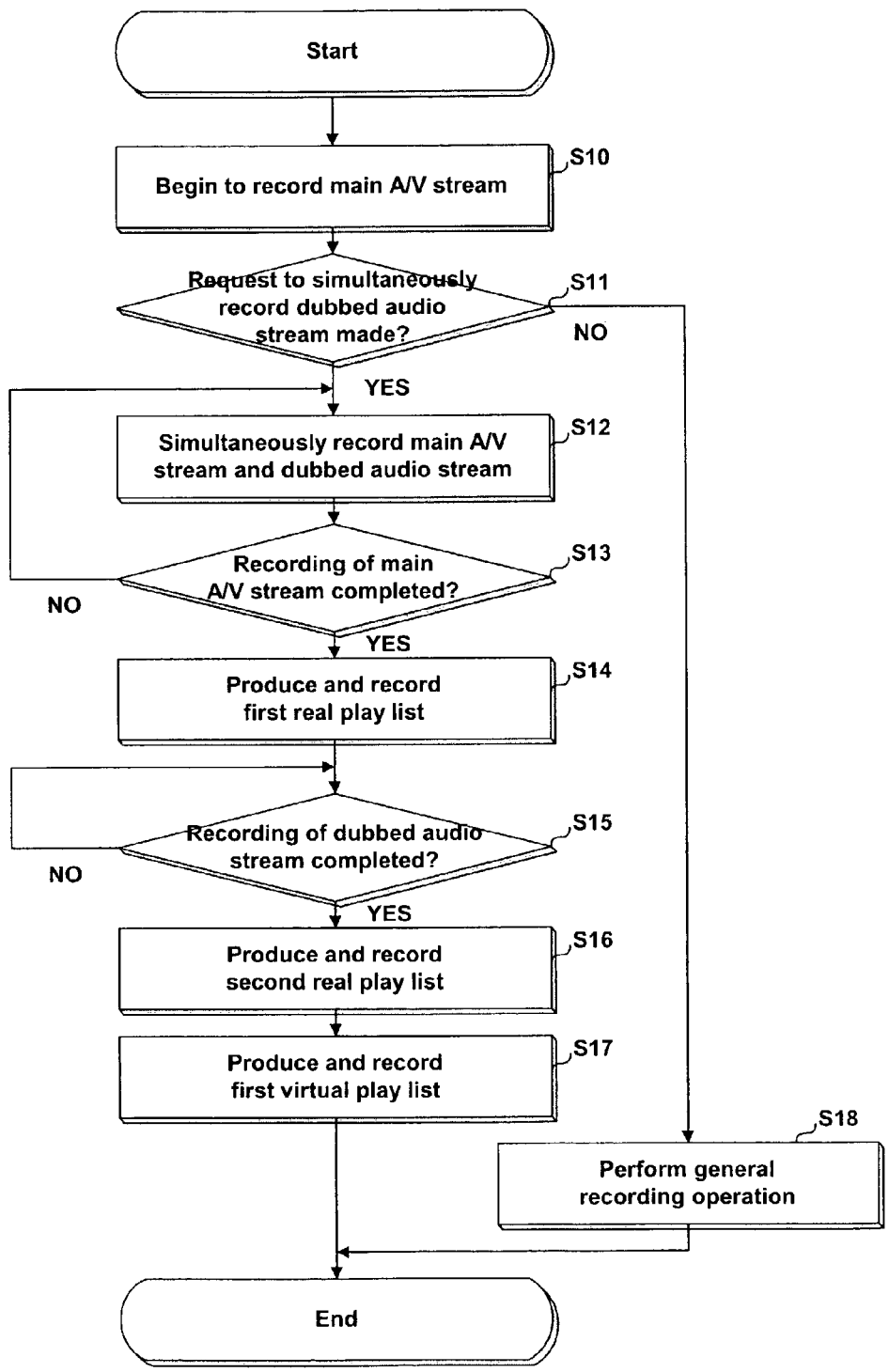
FIG. 3 is a flow chart illustrating a method for dubbing audio on rewritable medium according to an embodiment of the present invention.

FIG. 3 is a flow chart illustrating a method for dubbing audio on rewritable medium according to an embodiment of the present invention.

At the request of the user, the VDR system 3 begins to record video and audio data, externally inputted thereto, on the BD-RE 1 as a main A/V stream (S10).

Meanwhile, when the user requests the VDR system 3 to record additional audio data such as a voice of the user, externally inputted to the VDR system 3, as a dubbed audio stream corresponding to the main A/V stream (S11), simultaneously with the recording of the video and audio data, or when the current recording mode corresponds to a 'simultaneous recording mode' for simultaneously recording main A/V streams and dubbed audio streams, the VDR system 3 records the video and audio data as the main A/V stream while simultaneously recording the additional audio data as the dubbed audio stream (S12)

For example, the VDR system 3 temporarily stores the additional audio data in a first buffer (not shown) internally included therein, simultaneously with the recording of the video and audio data as the main A/V stream. When the audio data temporarily stored in the first buffer reaches a predetermined size to be appropriately recordable, the operation of recording the main A/V stream is temporarily stopped. In this state, the VDR system 3 temporarily stores video and audio data, subsequently inputted thereto, in another buffer, for example, a second buffer (not shown), internally included therein. Simultaneously, the VDR system 3 records the audio data of the predetermined size temporarily stored in the first buffer, as a dubbed audio stream. The VDR system 3 repeats such simultaneous recording operations.

When the recording of the main A/V stream is completed for one clip in accordance with the repetition of the simultaneous recording operations (S13), the VDR system 3 records clip information for distinguishing the recorded main A/V stream into one of sequential clip-unit A/V streams, for example, a first clip main A/V stream. At this step, the VDR system 3 also produces a first real play list (Real PlayList 1) including play control information for reading and reproduction of the recorded main A/V stream, and records the produced first real play list such that it is compatible with the file structure and format of the BD-RE 1 (S14).

When the recording of the dubbed audio stream is subsequently completed (S15), the VDR system 3 records clip information for distinguishing the recorded dubbed audio stream into a second clip dubbed audio stream. At this step, the VDR system 3 also automatically reproduces and records a second real play list (Real PlayList 2) including play control information for reading and reproduction of the recorded dubbed audio stream (S16).

Where the first and second real play lists are produced and recorded to control reproduction of respective main A/V stream and dubbed audio stream, as described above, the VDR system 3 also automatically produces a first virtual play list (Virtual PlayList 1) including a play item (PlayItem) for a main path linked to the first real play list, and a sub play item (SubPlayItem) for a sub path linked to the second real play list, and records the first virtual play list on the BD-RE 1 (S17).

Figure 4:
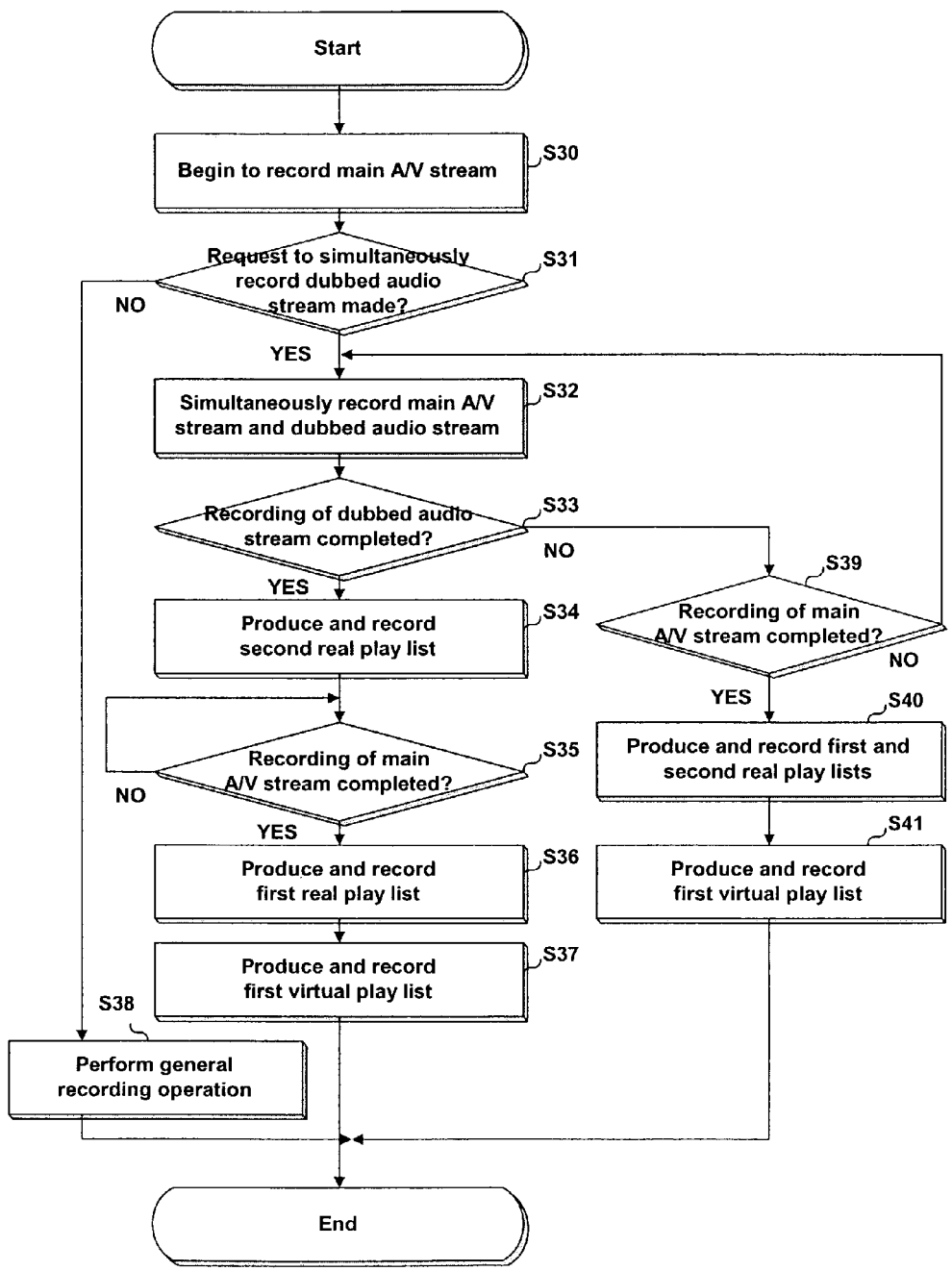
FIG. 4 is a flow chart illustrating a method for dubbing audio on rewritable medium according to another embodiment of the present invention.

FIG. 4 is a flow chart illustrating a method for dubbing audio on rewritable medium according to another embodiment of the present invention.

At the request of the user, the VDR system 3 begins to record video and audio data, externally inputted thereto, on the BD-RE 1 as a main A/V stream (S30).

Meanwhile, when the user requests the VDR system 3 to record additional audio data such as a voice of the user, externally inputted to the VDR system 3, as a dubbed audio stream corresponding to the main A/V stream (S31), simultaneously with the recording of the video and audio data, or when the current recording mode corresponds to a 'simultaneous recording mode' for simultaneously recording main A/V streams and dubbed audio streams, the VDR system 3 records the video and audio data as the main A/V stream while simultaneously recording the additional audio data as the dubbed audio stream, as described with reference to FIG. 3 (S32).

When the recording of the dubbed audio stream is completed in accordance with the repetition of the simultaneous recording operations (S33), the VDR system 3 records clip information for distinguishing the recorded dubbed audio stream into a second clip dubbed audio stream. At this step, the VDR system 3 also automatically reproduces and records a second real play list (Real PlayList 2) including play control information for reading and reproduction of the recorded dubbed audio stream (S34).

When the recording of the main A/V stream is subsequently completed for one clip (S35), the VDR system 3 records clip information for distinguishing the recorded main A/V stream into one of sequential clip-unit main A/V streams, for example, a first clip main A/V stream. At this step, the VDR system 3 also produces a first real play list (Real PlayList 1) including play control information for reading and reproduction of the recorded main A/V stream, and records the produced first real play list such that it is compatible with the file structure and format of the BD-RE 1 (S36).

Where the first and second real play lists are produced and recorded to control reproduction of respective main A/V stream and dubbed audio stream, as described above, the VDR system 3 also automatically produce a first virtual play list (Virtual PlayList 1) including a play item (PlayItem) for a main path linked to the first real play list, and a sub play item (SubPlayItem) for a sub path linked to the second real play list, and records the first virtual play list on the BD-RE1 (S37).

On the other hand, when the recording of the main A/V stream is completed under the condition in which the recording of the dubbed audio stream has not been completed yet (S39), the VDR system 3 produces and records the first real play list corresponding to the completely-recorded main A/V stream, and forcibly produces and records a second real play list corresponding to the dubbed audio stream recorded until the recording of the main A/V stream is completed (S40).

Thereafter, the VDR system 3 automatically produce the first virtual play list (Virtual PlayList 1) including the play item (PlayItem) for the main path linked to the first real play list, and the sub play item (SubPlayItem) for the sub path linked to the second real play list, and records the first virtual play list on the BD-RE1 (S41).

For reference, the recording operation for the dubbed audio stream may be completed before the recording of the main A/V stream is completed. Meanwhile, when the recording of the main A/V stream is completed before the recording of the dubbed audio stream is completed, as described with reference to FIG. 4, the recording operation for the dubbed audio stream may be automatically completed, depending on the completion of the recording of the main A/V stream.

As apparent from the above description, the present invention provides a method for dubbing audio on rewritable medium which is capable of allowing the user to conveniently manage recording of a dubbed audio stream corresponding to a main A/V stream recorded on the recording medium.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A method for dubbing audio on a writable recording medium, comprising the steps of:
   (A) simultaneously recording a main A/V stream and a dubbed audio stream corresponding to the main A/V stream on the writable recording medium, wherein the step (A) comprises the step of alternately carrying out a process of temporarily storing the dubbed audio stream in at least one buffer during the recording of the main A/V stream, and a process of temporarily storing the main A/V stream in the at least one buffer during the recording of the temporarily stored dubbed audio stream;
   (B) producing first and second real play lists respectively adapted to control reproduction of the main A/V stream and the dubbed audio stream, and recording the first and second real play lists on the writable recording medium; and
   (C) producing a virtual play list including a play item linked to the first real play list, and a sub play item linked to the second real play list, and recording the virtual play list on the writable recording medium.

2. The method according to claim 1, wherein
   the process of temporarily storing the dubbed audio stream includes storing the dubbed audio stream in a first buffer and the rocess of temporarily storm the main A/V stream stores the main A/V stream in a second buffer.

3. The method according to claim 1, wherein the step (B) comprises the steps of:
   automatically producing and recording the first real play list adapted to control the reproduction of the recorded main A/V stream when the recording of the main A/V stream is completed; and
   automatically producing and recording the second real play list adapted to control the reproduction of the recorded dubbed audio stream when the recording of the dubbed audio stream is completed, following the completion of the recording of the main A/V stream.

4. The method according to claim 1, wherein the step (B) comprises the steps of:
   automatically producing and recording the second real play list adapted to control the reproduction of the recorded dubbed audio stream when the recording of the dubbed audio stream is completed; and
   automatically producing and recording the first real play list adapted to control the reproduction of the recorded main A/V stream when the recording of the main A/V stream is completed, following the completion of the recording of the dubbed audio stream.

5. The method according to claim 1, wherein the step (B) comprises the steps of:
   completing the recording of the dubbed audio stream when the recording of the main A/V stream is completed prior to the completion of the recording of the dubbed audio stream; and
   producing and recording the first and second real play lists respectively adapted to control the production of the main A/V stream and the dubbed audio stream.

6. The method according to claim 1, wherein the step (C) comprises the step of automatically producing and recording a virtual play list including a play item for a main path adapted to control reproduction of the main A/V stream, and a sub play item for a sub path adapted to control reproduction of the dubbed audio stream when the first and second real play lists are produced and recorded.

7. The method according to claim 1, wherein the main A/V stream includes video data and main audio data, and the dubbed audio stream includes auxiliary audio data.

8. An apparatus for dubbing audio on a writable recording medium, comprising:
   a recording/reproducing unit configured to simultaneously record a main A/V stream and a dubbed audio stream corresponding to the main A/V stream on the writable recording medium;
   a buffer configured to temporarily store the dubbed audio stream during the recording of the main A/V stream, and to temporarily store the main A/V stream in the buffer during the recording of the temporarily stored dubbed audio stream; and
   a controller configured to produce first and second real play lists respectively adapted to control reproduction of the main A/V stream and the dubbed audio stream, and to produce a virtual play list including a play item linked to the first real play list, and a sub play item linked to the second real play list, and to control the recording/reproducing unit to record the first and second real play lists and the virtual play list on the writable recording medium.

9. The apparatus according to claim 8, the buffer comprising:
   a first buffer configured to temporarily store the dubbed audio stream during the recording of the main A/V stream, and a second buffer configured to temporarily store the main A/V stream in another internal buffer during the recording of the temporarily stored dubbed audio stream.

10. The apparatus according to claim 8, wherein the controller is further configured to automatically produce the first real play list adapted to control the reproduction of the recorded main A/V stream when the recording of the main A/V stream is completed, and to automatically produce the second real play list adapted to control the reproduction of the recorded dubbed audio stream when the recording of the dubbed audio stream is completed, following the completion of the recording of the main A/V stream.

11. The apparatus according to claim 8, wherein the controller is further configured to automatically produce the second real play list adapted to control the reproduction of the recorded dubbed audio stream when the recording of the dubbed audio stream is completed, and to automatically produce the first real play list adapted to control the reproduction of the recorded main A/V stream when the recording of the main A/V stream is completed, following the completion of the recording of the dubbed audio stream.

12. The apparatus according to claim 8, wherein the controller is further configured to control the recording/reproducing unit to complete the recording of the dubbed audio stream when the recording of the main A/V stream is completed prior to the completion of the recording of the dubbed audio stream, and to produce the first and second real play lists respectively adapted to control the production of the main A/V stream and the dubbed audio stream.

13. The apparatus according to claim 8, wherein the controller is further configured to automatically produce a virtual play list including a play item for a main path adapted to control reproduction of the main A/V stream, and a sub play item for a sub path adapted to control reproduction of the dubbed audio stream when the first and second real play lists are produced and recorded.

14. The apparatus according to claim 8, wherein the main A/V stream includes video data and main audio data, and the dubbed audio stream includes auxiliary audio data.

* * * * *